Aug. 27, 1968     J. J. MARTIN     3,398,922

CONTAINER TIE DOWN DEVICE

Filed Feb. 27, 1967     4 Sheets-Sheet 1

INVENTOR.
JOHN J. MARTIN
BY
Max R. Millman
ATTORNEY.

INVENTOR.
JOHN J. MARTIN
ATTORNEY.

Aug. 27, 1968  J. J. MARTIN  3,398,922
CONTAINER TIE DOWN DEVICE
Filed Feb. 27, 1967  4 Sheets-Sheet 3
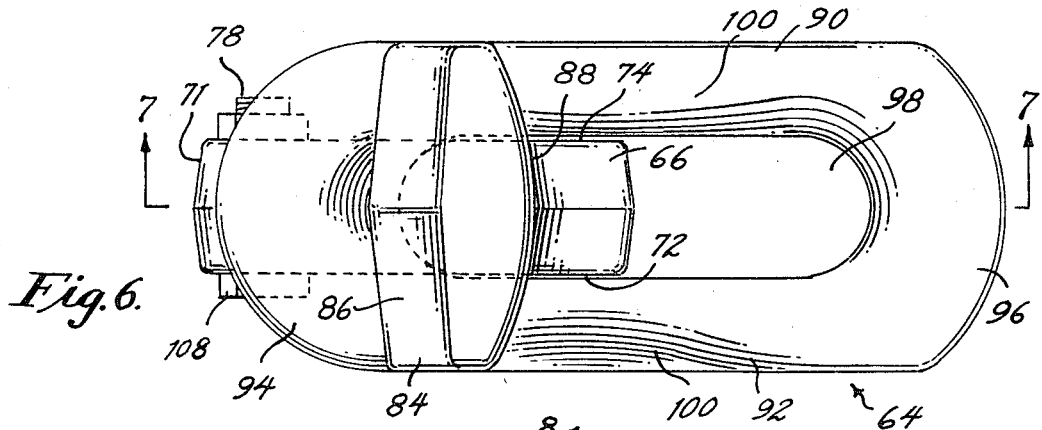
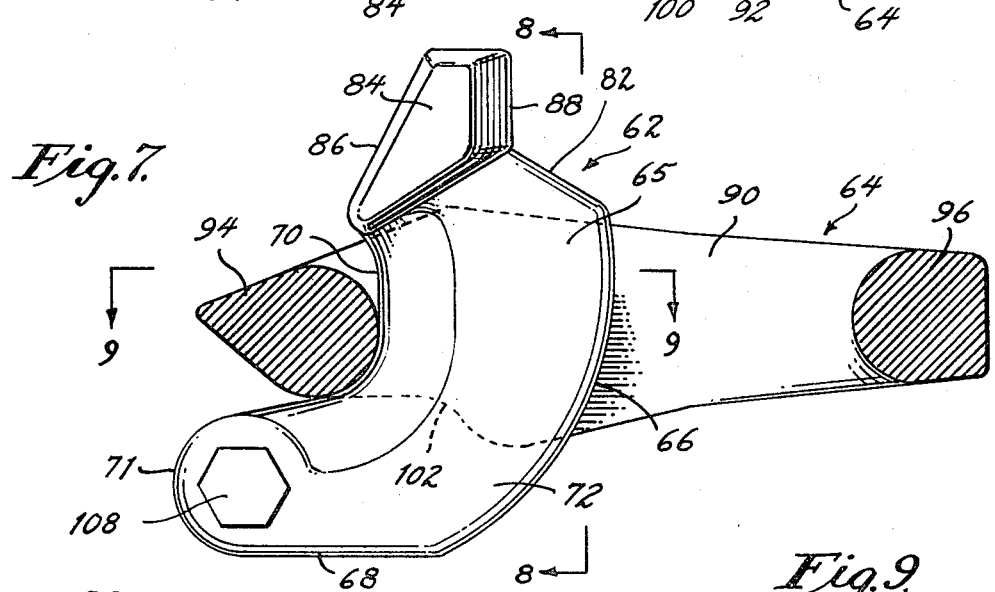
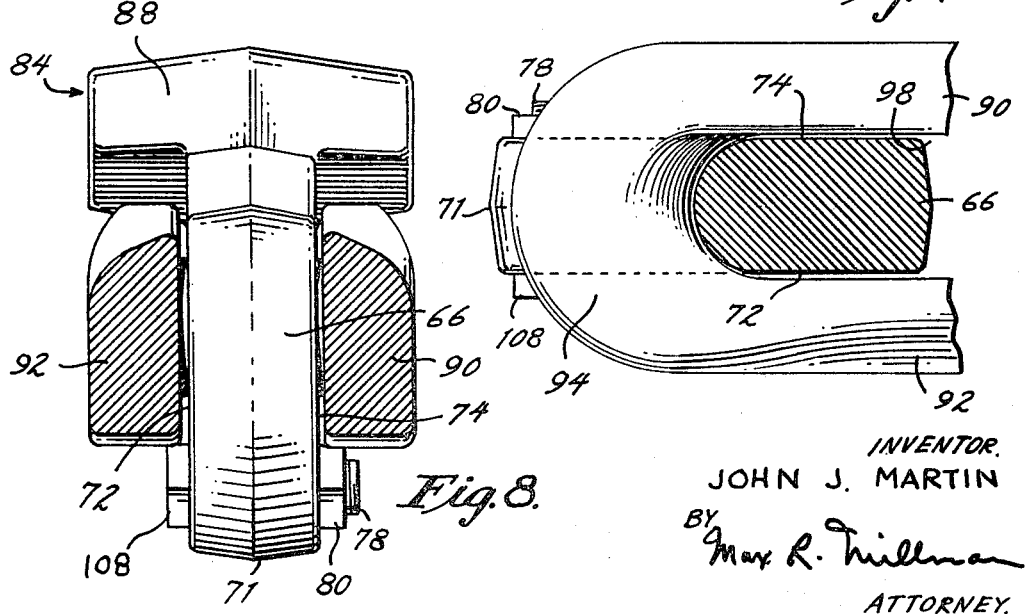
INVENTOR.
JOHN J. MARTIN
BY
Max R. Millman
ATTORNEY.

Aug. 27, 1968 J. J. MARTIN 3,398,922
CONTAINER TIE DOWN DEVICE
Filed Feb. 27, 1967 4 Sheets-Sheet 4

INVENTOR.
JOHN J. MARTIN
BY Max R. Millman
ATTORNEY.

United States Patent Office 3,398,922
Patented Aug. 27, 1968

3,398,922
CONTAINER TIE DOWN DEVICE
John J. Martin, Warminster, Pa., assignor to Strick Corporation, Fairless Hills, Pa., a corporation of Pennsylvania
Filed Feb. 27, 1967, Ser. No. 618,767
6 Claims. (Cl. 248—361)

ABSTRACT OF THE DISCLOSURE

For use with a cargo container incorporating hollow corner members with at least one slotted wall, a device adapted to be connected to a lashing cable or chain which is insertable into the corner member through the slot and which is readily turned to a positon to effect engagement of a portion of the device with part of the slotted wall to retain the device therein.

---

The modern trend in freight haulage is known in the art as containerization, a system employing van size cargo bodies as the shipping container which is transferred intermodally from over-the-road vehicles to railroads, to loading platforms, to ships, etc. without unloading the container until it reaches its final destination. Such containers are generally equipped with hollow corner fittings having one or more slotted walls whereby the container can be removably secured to lifting and transporting devices. On a railroad flatcar or on board ship, it becomes necessary to lash the container to the car or ship.

The primary object of this invention is to provide a device which can readily be connected to a lashing means and can easily be installed in the corner fitting through a slotted wall.

Another object of the invention is to provide a device of the character described which can be readily inserted through the slot in one wall of the corner fitting and easily rotated to the installed position where it grips or engages the wall, the construction being such that this rotation can be effected either through a slot in another wall of the corner fitting or through the same slot through which the device is inserted.

Another object of the invention is to provide a device of the character described which is comprised of an adapter and a link adapted for connection to a lashing means through which a portion of the adapter extends for relative rotatable movement. In the installed position, the adapter is located in the cavity of the hollow corner fitting with a portion thereof abutting the slotted wall of the corner fitting and a portion of the link extends through the slot. A means is provided to prevent the adapter from being pulled out of the slot accidentally upon downward movement of the link.

These and other objects of the invention will become more apparent as the following descripiton proceeds in conjunction with the accompanying drawings, wherein:

FIG. 6 is a top plan view of the device;

FIG. 7 is a sectional view taken on the line 7—7 of FIG. 6;

FIG. 8 is a sectional view taken on the line 8—8 of FIG. 7;

FIG. 9 is a sectional view taken on the line 9—9 of FIG. 7;

Specific reference is now made to the drawings in which similar reference characters are used for corresponding elements throughout.

Figure 1:
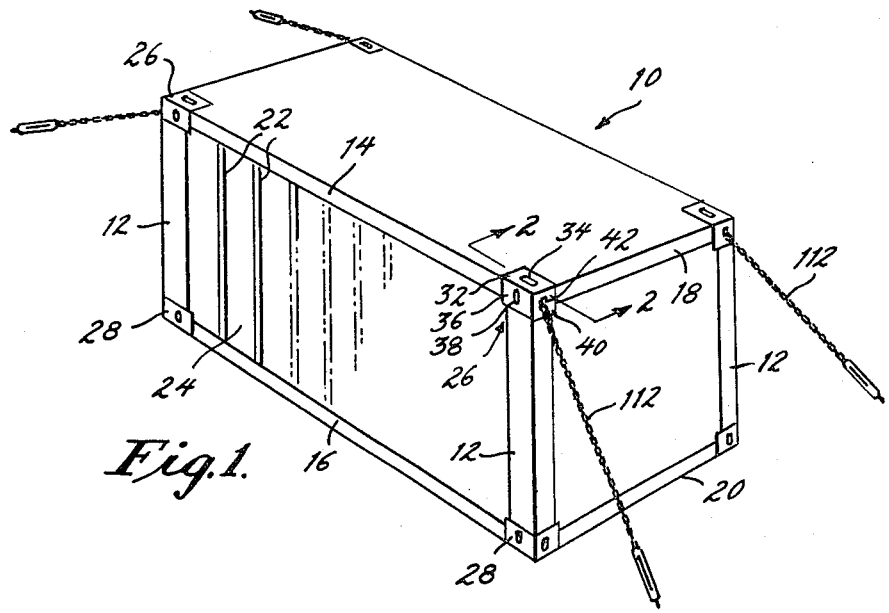
FIG. 1 is a diagrammatic perspective view of a container employing the instant device and a lashing means.

Indicated at 10 is a conventional cargo container adapted for intermodal transfer. It generally consists of vertical hollow corner posts 12, top or roof rails 14, bottom or side rails 16 and front and rear, upper and lower transverse sills 18 and 20. The side walls comprise longitudinal spaced posts 22 secured top and bottom to the roof and side rails 14 and 16. Panels forming a skin 24 are secured to the posts 22 and to the roof and side rails to complete the wall. The same construction prevails for the end walls, except that the rear end wall is provided with hinged doors for access to the interior of the container.

Upper and lower corner members or fittings 26 and 28, preferably steel castings, are welded in place to the corner posts 12, the roof or side rails 14 and 16 and the upper or lower end sills 18 and 20. The upper and lower corner members may be identical or they may be different in construction. Since the lashing of the container on board ship or on a rail car will be effected through the upper corner members, a description of these corner members will suffice. Each is a generally cuboid hollow body having an internal cavity 30 and includes among other things a top horizontal wall 32 with an elongated slot 34 therethrough, a vertical side wall 36 with an opening 38 therethrough, an outer vertical end wall 40 with an opening 42 therethrough, a horizontal bottom wall 44 and an inner vertical end wall 46.

The opening 42 has a lower curved edge 48 which is substantially flush with the inner surface of the bottom wall 44. Its uper edge 50 is rounded and curved constitutes the lower edge of the upper portion 52 of the end wall 40 which is of a desired thickness and hence includes an inner surface 54 which forms the outer edge of the slot 34.

In the modification shown in FIGS. 1–5, the outer edge 56 of the bottom wall 44 is in the same vertical plane as the outer face of the end wall 40. In the modification shown in FIGS. 10–12, the outer edge 58 of the bottom wall 44 is inwardly recessed relative to the outer face of the end wall 42 so that the latter includes a downwardly and inwardly inclined portion 60 through which the lower portion of the slot 42 extends.

Coming now to the tie down device itself, it comprises two parts, an adapter 62 and a link 64.

The adapter includes a generally C-shaped member 65 having an arcuate outer surface 66 which terminates in a lower flat surface 68. The inner edge 70 is also arcuate and at its lower end joins the inner end of the flat surface 68 by means of a lower rounded edge 71. The sides 72 and 74 of the adapter are flat and a through bore 76 extends laterally through the member and the sides and is located adjacent the lower rounded edge 71, the bore being adapted to removably receive the shank of a headed bolt 78 and a nut 80 threaded thereon. At its upper end, the curved surface 66 recedes inwardly to form a curved ledge 82. Extending across the C-shaped member at its upper edge and extending beyond the sides 72 and 74 thereof is a cross head 84 which has an inner downwardly and rearwardly inclined surface 86 and an outer curved surface 88.

The link 64 is a ring like member having longitudinal members 90 and 92 which are interconnected at their ends by members 94 and 96 thus providing a central opening 98 through which the C-shaped member 65 movably extends, the width of the member 65, i.e. the distance between the sides 72 and 74, approximates but is somewhat less than the width of the opening 98, i.e. the distance between the confronting inner surfaces of the longitudinal members 90 and 92. As seen particularly in FIGS. 6–9, the inner member 94 is tapered, indentations 100 are provided in the members 90 and 92 adjacent their upper edges and the entire link 64 is contoured to permit smooth relative movement between the link and the adapter and ease of insertion into the corner member. The lower edges of the members 90 and 92 are provided with rounded notched out portions or recesses 102 adjacent the inner member 94 for a purpose soon to appear.

The cross head 84 at the top of the adapter 62 as stated earlier, is an elongated member which extends beyond the sides 72 and 74 of the C-shaped member 65. Its length, i.e. the distance from one end wall 104 to the other 106, see FIG. 3, approximates but is somewhat less than the width of the end wall opening 42 and the width of the top wall opening 34.

Figure 5:
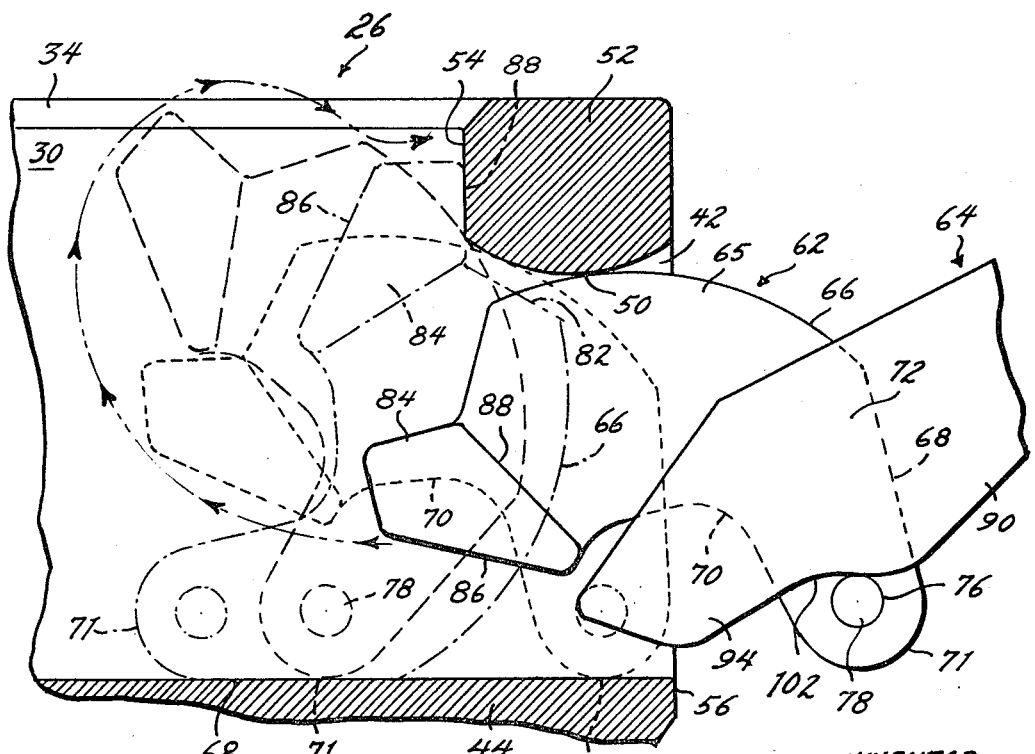
FIG. 5 is a diagrammatic view, parts shown in section, illustrating the process of installing the device in the corner fitting.
Figure 3:
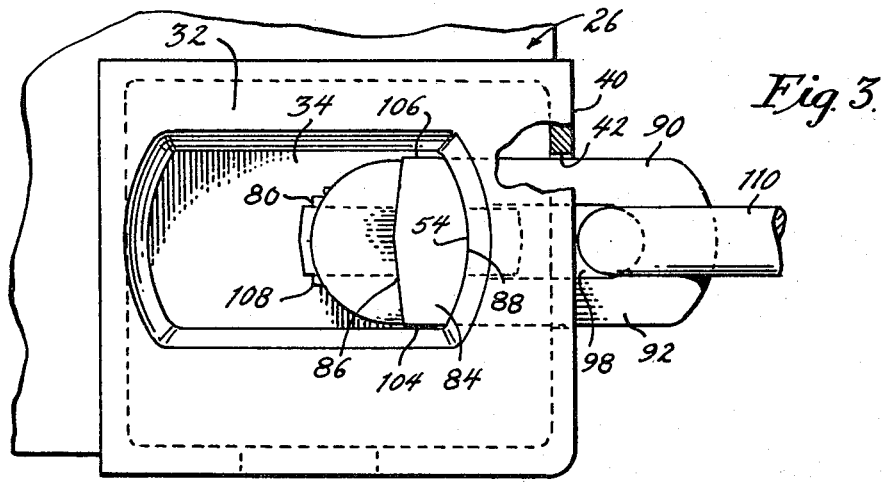
FIG. 3 is a sectional view taken on the line 3—3 of FIG. 2.
Figure 2:
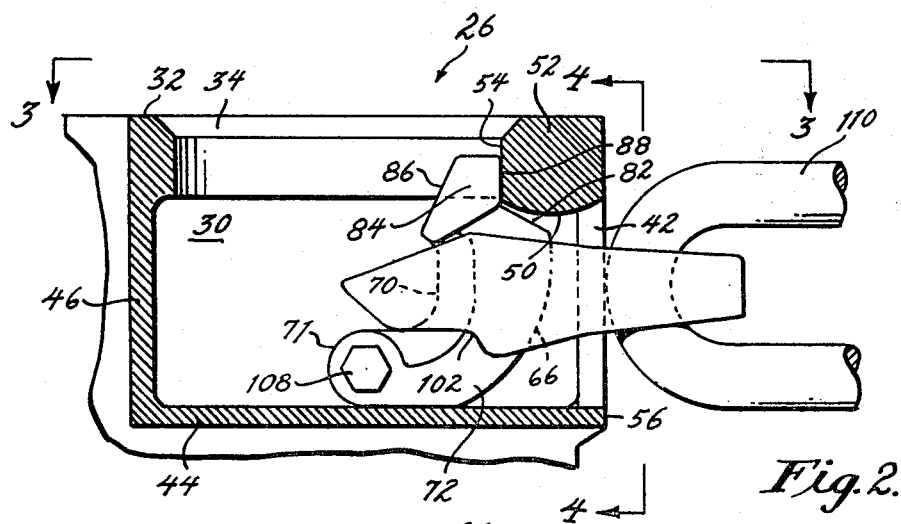
FIG. 2 is an enlarged sectional view taken on the line 2—2 of FIG. 1.
Figure 4:
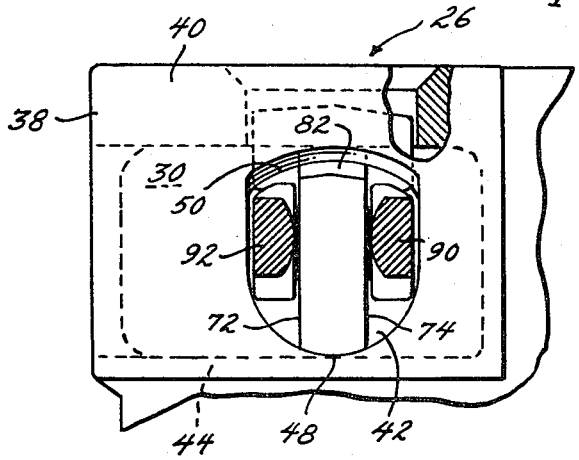
FIG. 4 is a sectional view taken on the line 4—4 of FIG. 2.

In use, as seen particularly in FIG. 5, the adapter 62 is extended through the opening 98 in the link 64 and the bolt 78 is extended through the bore 76 of the adapter after which the nut 80 is threaded thereon. The head 108 of the bolt and the nut 80 serve as stops which engage the link members 90 and 92 to prevent removal of the adapter from the link in one direction and the head 84 serves as a stop to engage the link and prevent its removal therefrom in the opposite direction. The adapter is turned to a position shown in solid lines in FIG. 5 in which the head 84 is down and the surface 86 thereof faces the bottom wall 44. In this position the bolt head 108 and nut 80 are engaged in the notches 102. The cross head 84 is then moved through the opening 42 in the end wall 40 as is the member 94 of the link 64. This motion is continued until the head 84 extends sufficiently into the cavity 30 of the corner member to be engaged by fingers which are inserted either through the top opening 34 or side opening 38. When the fingers grasp the cross head 84 it is rotated upwardly until its outer surface 88 engages the inner surface 54 of the upper member 52 of the end wall 40 as shown in dotted lines in FIG. 5. This pulls in about ⅔ of the link 64 and in the final position the lower flat surface 68 of the adapter bears against the inner surface of the bottom wall 44 of the corner member. If the link member 64 is attached beforehand to the link 110 of a chain 112 or other lashing device such as a cable, the final installed position of the device as previously described can be effected only by insertion of the fingers through the top or side hole for engagement with the adapter cross head. However, if the device is to be installed before it is attached to a lashing chain or cable, the adapter 62 can be turned from its insertion to its final installed position by exerting finger pressure on the flat surface 68 inwardly towards the cavity 30 of the corner member. It is also possible to insert the device when unattached to the lashing means through the top wall opening 34 and then manipulated to assume the final installed position as shown in FIGS. 2 and 10.

Figure 11:
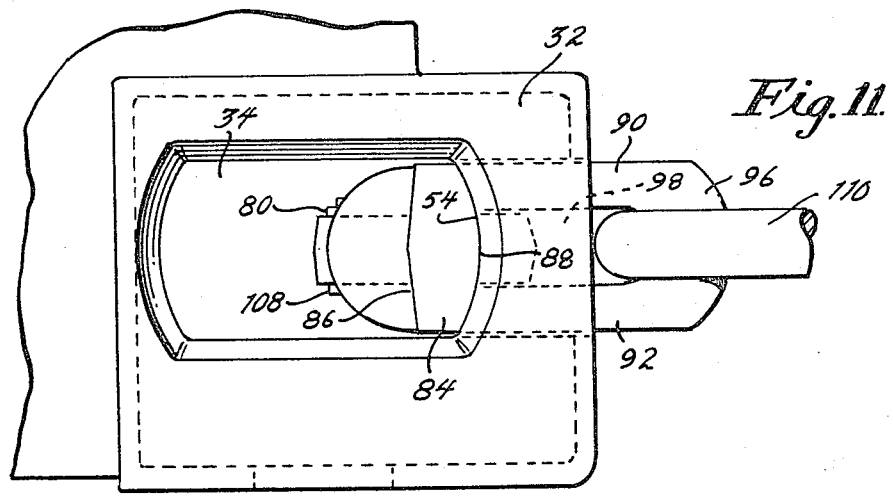
FIG. 11 is a sectional view taken on the line 11—11 of FIG. 10.
Figure 10:
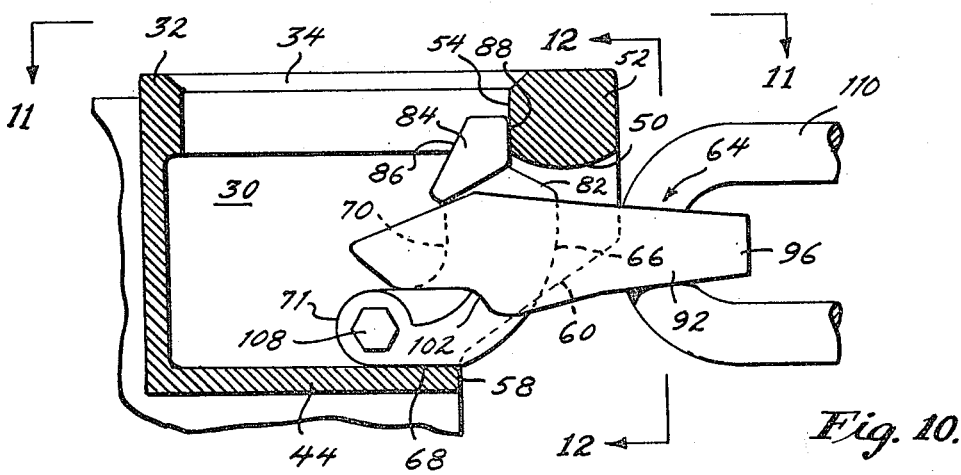
FIG. 10 is a view similar to FIG. 2 showing the device installed in a modified corner fitting.
Figure 12:
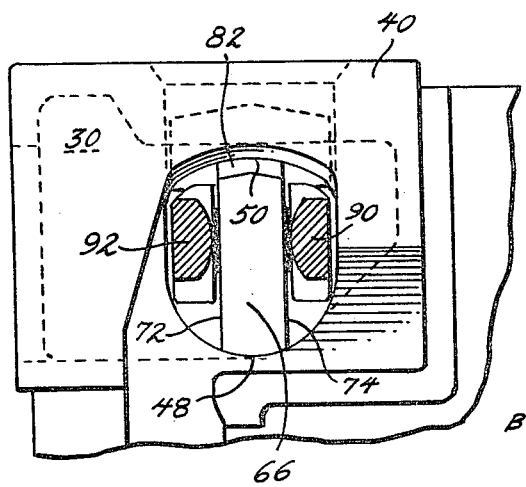
FIG. 12 is a sectional view taken on the line 12—12 of FIG. 10.

In the modification shown in FIGS. 10–12 where the end wall 40 has a downwardly and inwardly inclined face 60 through which a portion of the slot 42 extends, after installation, the link member 64 is capable of turning through a greater arc than that of the other modification. In so doing the adapter is raised so that the ledge 82 firmly engages the lower edge 50 of the top member 52 of the wall 40 to prevent accidental removal of the device from the corner member through the end wall slot or opening 42.

While preferred embodiments of the invention have here been shown and described, skilled artisans may make minor variations without departing from the spirit of the invention and the scope of the appended claims.

I claim:

1. For use with a container having a corner member including a vertical wall with a slot therethrough and a cavity therebehind, a device adapted to be removably retained in said corner member and to be attached to a tie down member, said device comprising a ring-like link member having an elongated opening therethrough, an adapter having a portion extending movably through said opening, a cross head at one end of said portion of said adapter extending laterally beyond said link member opening and of length slightly less than the width of said slot in said corner member, and stop means adjacent the other end of said portion of said adapter so that when said adapter is moved relative to said link member so that said cross head is in a down position and said stop means engages said link member said cross head can be inserted through said corner member slot and then turned therein to an up installed position wherein one face of said cross head abuts the inner surface of said vertical wall above said slot.

2. The combination of claim 1 wherein said stop means includes an elongated member extending transversely through said adapter portion adjacent said other end thereof including end portions adapted to abut said link member.

3. The combination of claim 2 wherein said link member includes notches receiving said end portions of said stop means when said stop head is in the down position ready for insertion through said corner member slot.

4. The combination of claim 1 wherein said corner member also includes a bottom wall, said adapter including a substantially flat surface adjacent said stop means adapted to bear on the inner face of said bottom wall when said one face of said cross head abuts the inner surface of said vertical wall above said slot.

5. The combination of claim 1 wherein said portion of said adapter includes an outer arcuate surface and a ledge between said cross head and said arcuate surface adapted to engage beneath the edge of said vertical wall at the upper end of said slot to prevent accidental removal of said adapter from said corner member upon downward movement of said link member.

6. The combination of claim 1 wherein said portion of said adapter includes an inner curved surface and said link member includes an end portion adapted to engage said inner curved surface whereby said adapter may be smoothly rotated so that the cross head can be moved from the down insertion position to the up installed position.

References Cited
UNITED STATES PATENTS

| | | |
|---|---|---|
| 2,930,330 | 3/1960 | Jensen et al. |
| 3,011,749 | 12/1961 | Kozak _____ 248—361 |
| 3,043,550 | 7/1962 | Garbarino et al. _____ 248—361 |
| 3,314,633 | 4/1967 | Romberg _____ 248—119 |

JOHN PETO, *Primary Examiner.*